Figure 1:
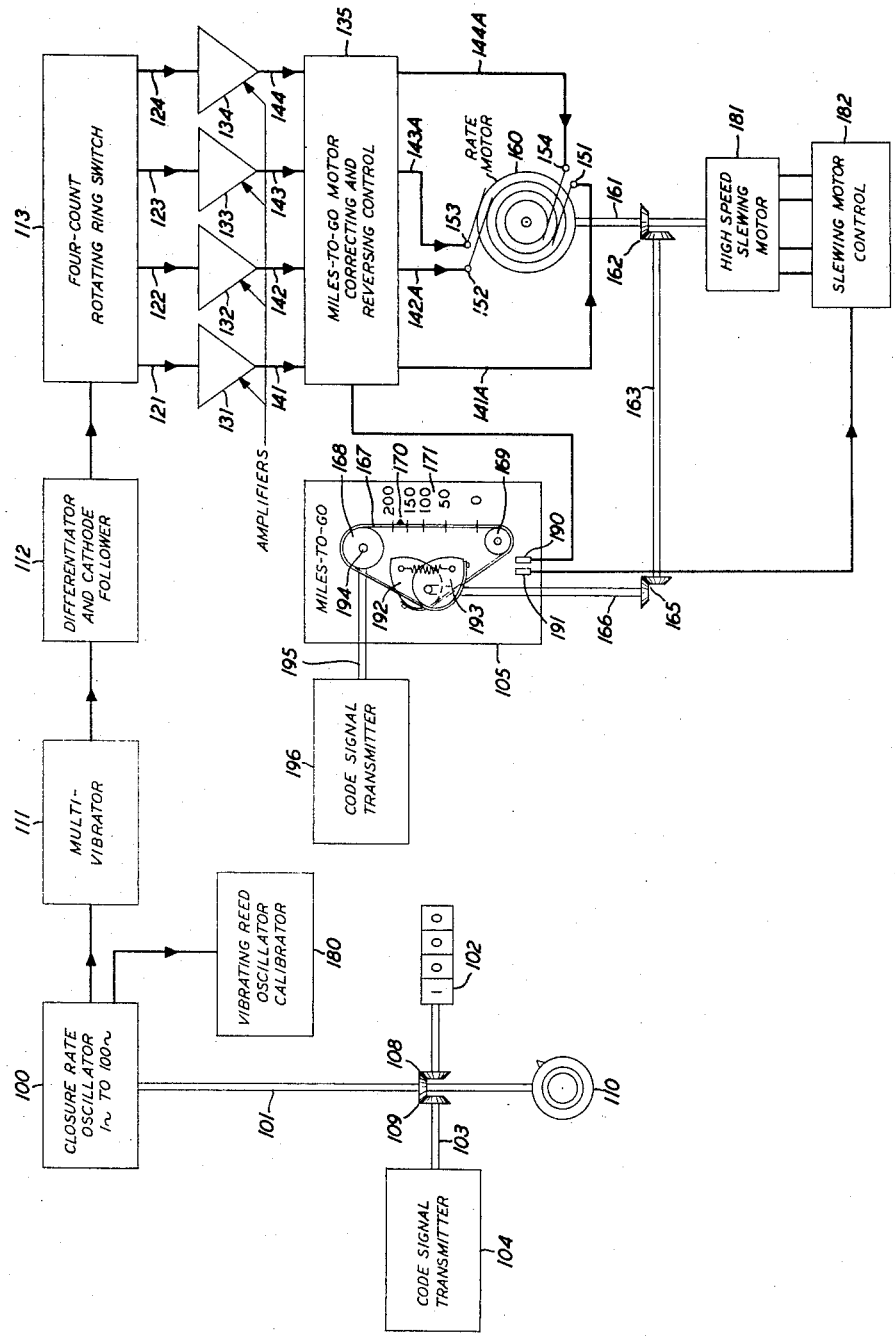

March 24, 1959

R. V. CRAWFORD ET AL 2,879,460

CONTROL CIRCUIT FOR INDICATOR

Filed Dec. 18, 1956

2 Sheets-Sheet 2

INVENTORS R.V. CRAWFORD
F.J. HENNEBERG

BY

John E. Cassidy

ATTORNEY

United States Patent Office 2,879,460
Patented Mar. 24, 1959

2,879,460

CONTROL CIRCUIT FOR INDICATOR

Robert V. Crawford, Dobbs Ferry, and Frank J. Henneberg, Valley Stream, N.Y., assignors to Bell Telephone Laboratories, Incorporated, New York, N.Y., a corporation of New York Application December 18, 1956, Serial No. 629,434

5 Claims. (Cl. 318—55)

This invention is an improved control circuit for controlling a motor-driven indicator. The motor-driven indicator is disclosed in a patent application, Serial No. 629,433, by R. V. Crawford, one of the joint applicants of the present application, filed on even date herewith, which is hereby incorporated herein by reference as though fully set forth herein.

An object of the invention is the improvement of the controls of a motor-driven indicator.

In the application identified in the foregoing, there is disclosed a motor-driven indicator having means for adjusting the speed of the driving motor and indicator, which means comprises a variable oscillator which can be set at any one of 100 rates of oscillation, for instance, in 100 equal discrete steps.

The present invention affords supplementary desirable controls for the motor-driven indicator, which controls may be incorporated in a system with the oscillator and motor controls described in the above-identified patent application, in a manner to be made clear hereinafter.

Figure 2:
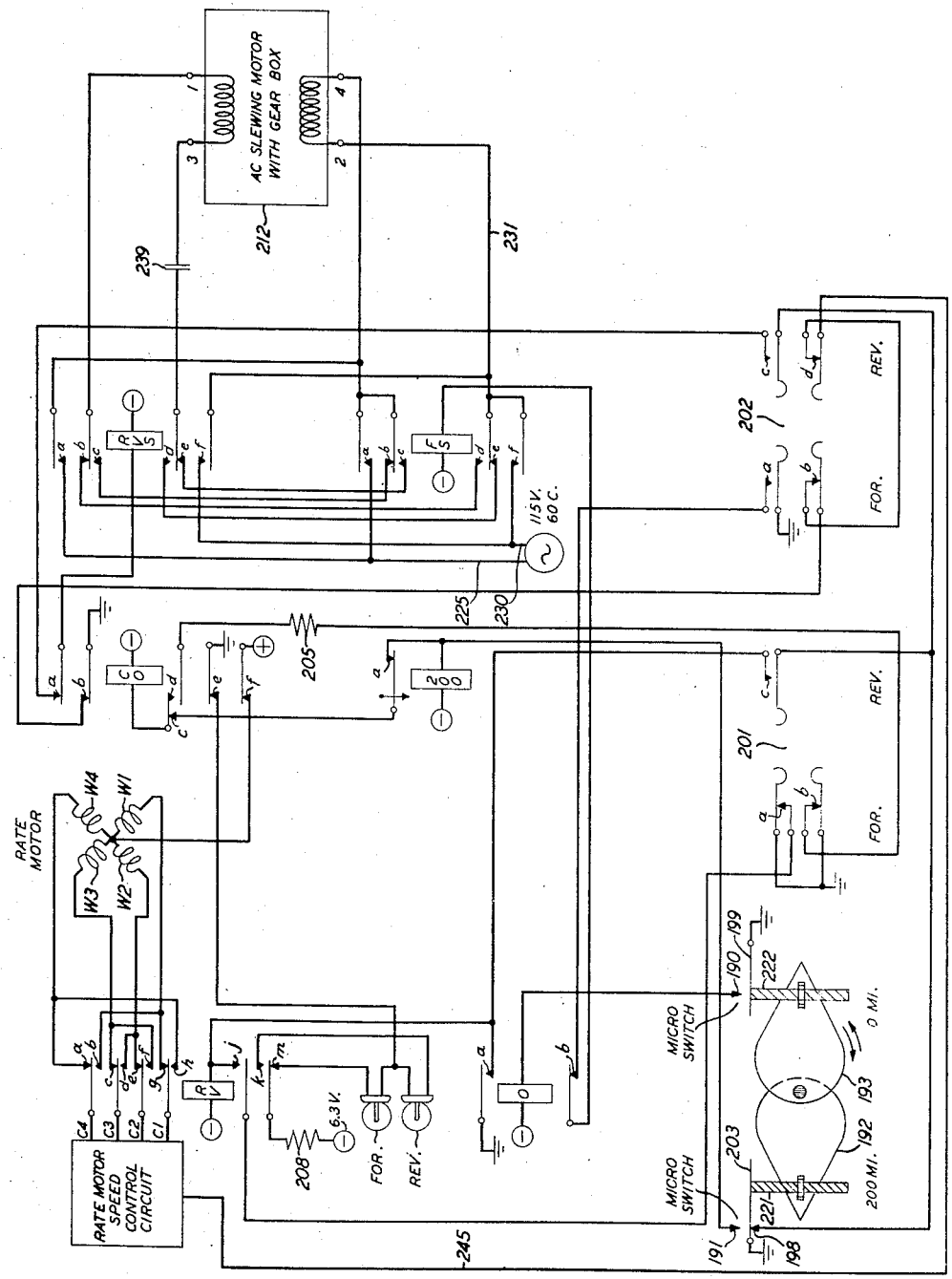

The invention may be understood from the following description when read with reference to the associated drawings which taken together disclose a preferred embodiment of the invention. It is to be understood, however, that the invention may be practiced in other forms which will be readily suggested to those skilled in the art from a consideration of the following. In the drawings:

Fig. 1 is a closure-rate and miles-to-go control circuit in which the miles-to-go motor correcting and reversing control circuit of the present invention is incorporated; and Fig. 2 is the miles-to-go motor correcting and reversing control circuit of the present invention.

First the system of Fig. 1, in which the circuit of the present invention is incorporated, will be described generally, as an aid in understanding the detailed description of the operation of the circuit of the present invention to follow.

Refer now to Fig. 1. The system of Fig. 1, in one aspect, is an indicator controlled by an electric motor, the speed of rotation of which may be set at any one of 100 rates by means primarily of an oscillator, the rate of oscillation of which may be set at any one of 100 discrete rates of oscillation. The indicator may be employed, for instance, to indicate the rate at which the distance separating two objects is changing. In one preferred embodiment one of these objects may be a mobile unit, for instance, such as a friendly airplane in flight and the other object may be a target such as an enemy airplane in flight, which the friendly plane is directed to intercept by flying a prescribed course at an ordered speed. The indicator is driven by a motor at a speed proportional to the ordered speed of the controlled plane.

In the system of Fig. 1 it is contemplated that the information necessary to enable the directed plane to intercept the hostile plane, which information includes the direction of the line of flight, the altitude, the speed and the distance between the directed plane and the enemy plane, is first determined by radar and computation at a land station or on a ship, such as an airplane carrier, hereinafter termed a control station. Then this information is transmitted to the plane by radio telegraphy. The control station thus directs the friendly plane to fly toward a predetermined intercepting point in the path of the enemy plane at a rate of speed calculated to effect the interception.

It is desirable that there be a continuing indication at the control station of the distance separating the two planes. The system of Fig. 1, in one embodiment, affords means whereby the speed of a variable-speed motor at the control station may be conveniently set at any desired percentage of its maximum speed in discrete steps, from 1 to 100, and the motor may be employed to drive an indicator mechanism, which is first set to show the distance separating the two planes at the start. Thereafter, the indicator is driven to a zero position under control of the motor, the speed of which is set and maintained at a rate proportional to the rate of closure of the planes throughout the interval of interception.

It is particularly pointed out that the means by which the line of flight, altitude, and distance are determined are not a part of the system of Fig. 1.

At the upper left in Fig. 1 is shown a closure-rate oscillator 100, the rate of oscillation of which may be varied in 100 equal discrete steps from one cycle to 100 cycles per second. An oscillator suitable for this purpose is a low-frequency oscillator which, by way of example, may be of the kind manufactured by the Southwestern Industrial Electronics Company, modified by the provision of a double-ganged rheostat having precision resistors to give a one-cycle change in frequency for each three-degree rotation of the control shaft from zero to 300 degrees. The rate of oscillation of the oscillator is adjusted by means of a closure-rate dial 110 by means of which the shaft 101 may be rotated. The dial 110 may be set in any one of 100 rotary positions. The shaft 101, in turn, actuates a contact element, not shown, which governs the insertion of any one of 100 pairs of resistors in the tuning circuit of the oscillator. This varies the rate of oscillation of the oscillator in 100 equal discrete steps from one cycle to 100 cycles per second. Geared to the shaft 101 through gears 108 is a progressive counter 102, which indicates the rate of closure directly in miles per hour, for instance. As the circuit is arranged so that each of the divisions of dial 110 effects a change of one cycle in the oscillator, which is translated by other circuit elements into an indication of a closure-rate change of 10 miles per hour, for instance, the counter 102 may be arranged to indicate a range from 10 to 1000 miles per hour, in 100 steps, each representing 10 miles. Geared also to shaft 101 through gears 109 is shaft 103, which controls code signal transmitter 104. The code signal transmitter, which may be any one of a number well known in the art, is arranged to set up and transmit a distinctive individual multielement permutation code signal combination for each of the 100 possible settings of dial 110 and corresponding discrete rates of oscillation of the oscillator 100. These code combinations are transmitted by radio telegraphy, for instance, to a friendly airplane in flight and serve as a command to the plane's pilot to operate the plane at the speed defined by the combination. This, with other information, such as line of flight and altitude, transmitted by other means, is intended to direct the plane to effect, for example, interception of a hostile plane.

At the time the information is sent, the control station has knowledge, through other means, such as radar, of the total distance required to be traversed to effect the interception. To anticipate, an indication of this distance is set up on an indicator 105, the function of which is to afford a continuous indication at all times during the intercepting process of the distance remaining to be travelled before interception is effected. This is achieved by first setting the indicator 105 to indicate the initial distance on a graduated scale and then driving the indicator toward a zero position under control of the motor, at a rate proportional to the speed at which the friendly plane has been commanded to fly.

To resume the general description of the system of Fig. 1, the output of the closure-rate oscillator 100 is connected to a multivibrator circuit 111, which functions to transform the sine wave output of the closure-rate oscillator 100 into what is essentially a square wave. The square wave is impressed on a differentiator and cathode follower 112 which produces sharp narrow pulses or spikes required for operation of the four-count rotating-ring circuit 113, which is arranged to function as a four-contact rotating switch and which has four individual outputs 121, 122, 123 and 124, one for each of its four individual counting stages. Each of these outputs is impressed on an individual amplifier 131, 132, 133 and 134. The individual outputs 141, 142, 143 and 144 of each of the amplifiers may be impressed through the miles-to-go correcting and reversing control circuit of the present invention shown in detail in Fig. 2 and representing in Fig. 1 by the captioned rectangle 135. When the miles-to-go motor correcting and reversing control circuit is not required, the output 141, 142, 143 and 144 of the amplifiers may be impressed directly on terminals 151, 152, 153 and 154 of motor 160. It is particularly pointed out that the miles-to-go motor correcting and reversing circuit 135, shown in detail in Fig. 2, is a means of affording certain desirable additional controls for the system of Fig. 1 and is not essential to the operation of Fig. 1. Each of the terminals 151, 152, 153 and 154 connects to an individual winding of the two-phase slow-speed synchronous motor 160. Each of the windings, not shown in Fig. 1, has a common inner terminal, connected to a source of positive battery which serves as a plate supply for the amplifiers 131, 132, 133 and 134 as explained in detail in the sole patent application of R. V. Crawford identified in the foregoing. When the miles-to-go motor connecting and reversing control circuit is employed, it is connected by means of four conductors 141A, 142A, 143A and 144A, which corresponds to conductors 141, 142, 143 and 144, respectively, to terminals 151, 152, 153 and 154, respectively.

For different interceptions, the commanded rate of speed transmitted to a controlled plane from transmitter 104 may be changed as required by changing the setting of dial 110. The rate of oscillation of oscillator 100 changes responsively. The multivibrator 111 and differentiator and cathode follower 112 produce their characteristic outputs at corresponding rates. Each stage of the four-count rotating-ring circuit 113 sends a pulse to its amplifier once every fourth cycle of the oscillator. These, when impressed on the four individual windings of the motor, actuate its rotor through a fixed angle for each pulse. The angle remains the same for each pulse notwithstanding the differing rates at which the pulses may be impressed on the motor. The rate of rotation of the motor is therefore directly proportional to the rate of oscillation of the oscillator.

The motor 160 is coupled through shaft 161, gears 162, shaft 163, gears 165, and shaft 166 to the miles-to-go indicator 105. Secured to the shaft 166 in indicator 105 is a belt-driving wheel, not shown, which drives a belt 167. The belt 167 passes over two idler wheels 168 and 169. Secured to the belt is an indicator pointer 170, which is actuated in a path in registry with a graduated scale 171, marked with numbers indicating miles to go. The indicator pointer 170 may be set by hand, for instance, or under control of the miles-to-go motor correcting and reversing control circuit 135, to any initial position on the scale in registry with a number indicating miles to go. As the system is operated, during any intercepting operation, the indicator pointer 170 is driven, at a rate proportional to the setting of the oscillator, from its initial position toward the zero position on the scale. The indicator shows at any time the miles remaining to be traversed and the speed of its movement, during a recorded interception, affords a visual indication of the rate of closure.

Fig. 1 shows also additional features. The oscillator may be provided with calibrating means 180, such as a vibrating-reed oscillator, for instance. The indicator 105 is jointly controlled by means of a relatively high-speed motor 181, called the slewing motor, through a slewing-motor control circuit 182 having forward drive and reversing keys for each motor. The motors are also controlled by means of limiting-switch contacts 190 and 191 through the action of cams 192 and 193. The limiting switches operate to prevent further movement of belt 167 and of indicator 170 at the two extreme ends of the scale 171. The slewing motor 181 functions to actuate the belt 167 and the pointer 170 at a high speed either in the normal forward direction or in the reverse-from-normal direction, when required in setting the indicator to the desired position at the start of an interception attempt.

It is contemplated that the controlled plane also will be furnished with means for providing a continuous indication of the miles to go to the target. In order to control this mechanism in the plane, permutation code signal combinations will be produced in code signal transmitter 196 which is coupled through shaft 195 and gears, not shown, to shaft 194 to which idler 168 is secured. As shaft 194 is rotated, a succession of multielement permutation code signal combinations are transmitted, in any of a number of manners well known to those skilled in the art, defining successive decreasing distances remaining to be traversed by the controlled plane, so that the plane pilot may be constantly informed of his nearness to his objective.

The circuit of the present invention, as shown on Fig. 2, essentially provides means for controlling the direction and speed of motion of the indicator under control either of the rate-of-closure motor, called the rate motor, or of the relatively high-speed slewing motor. The circuit provides means also for stopping or reversing the indicator in limiting positions at the two extreme ends of the miles-to-go scale.

There are, in all, seven major functions performed by the motor rotation-control circuit for the miles-to-go indicator shown in Fig. 2, as follows:

(1) It determines the direction of travel of the miles-to-go indicator under locked-in speed control of the closure-rate oscillator by a momentary operation of the miles-to-go key 201;

(2) It determines the direction and duration of high-speed travel of the miles-to-go indicator under control of the slewing motor by operation of slewing key 202;

(3) It automatically reverses the direction of travel of the rate motor and thereby the direction of travel of the miles-to-go indicator when the miles-to-go indicator reaches zero miles, thus indicating an approach to or departure from the target;

(4) It automatically stops the rate motor and the slewing motor and extinguishes the lighted direction-of-travel indicator lamp REV when the miles-to-go indicator reaches 200 miles;

(5) It automatically stops the slewing motor when the miles-to-go indicator reaches zero miles;

(6) It lights either the forward direction-indicating lamp FOR or the reverse direction-indicating lamp REV to correspond with the direction of travel of the miles-to-go indicator; and (7) It prevents false operation of either motor, and consequently possible damage to the rate mechanism, resulting from improper sequence of operation of the control keys during the period in which the cam-operated limiting microswitches 203 and 204 are operated.

A detailed description of the operation of the motor-direction control circuit of Fig. 2 will now follow:

Since a certain sequence of circuit operation takes place upon applying voltage to this circuit, the description will begin with the miles-to-go indicator assumed to be in the stopped position at the 200-mile end of the scale, and with the lights FOR and REV which indicate the forward and reverse direction of travel of the indicator both extinguished. For this condition also relays RV and CO are both locked in their operated condition under control of the miles-to-go key 201, the contacts a and b of which are closed for forward operation. The locking circuit for relay RV may be traced from battery through the winding of relay RV, contact j of relay RV and contact a of key 201 to ground. The locking circuit for relay CO may be traced from battery through the winding of relay CO, contact d of relay CO, resistor 205, and contact b of key 201 to ground. The manner in which relay RV and relay CO were operated prior to locking and the reason for starting at this point in the description will be made clear hereinafter.

In order to activate the miles-to-go indicator, miles-to-go key 201 is operated to open its contacts a and b. The locking path for relay RV was traced through contact a of key 201. The locking path of relay CO was traced through contact b of key 201. The opening of these two contacts therefore releases relay RV and relay CO. When relay RV was operated, the rate motor was arranged for rotation in the reverse direction and when relay RV is released it is arranged for forward operation. A path may be traced from positive battery through contact f of relay CO to the junction of the inner terminals of each of the four windings W1, W2, W3 and W4 of the rate motor. Each of the windings W1, W2, W3 and W4 is connectable through either one of two contacts of relay RV to either one of two conductors of conductors C1, C2, C3 and C4. These conductors connect in the motor speed-control circuit to the anodes of individual amplifier triodes, each of which is controlled by an individual one of four counting stages of a four-stage counting circuit arranged as a reentrant-ring circuit, which in turn is controlled by the variable oscillator. The interconnections of the motor windings to the counting stages are arranged so that when relay RV is released, as shown, for the forward direction of rotation counting stages 1, 2, 3 and 4 connect through conductors C1, C2, C3 and C4, respectively, and contacts g, e, c and a, respectively, of relay RV, to windings W1, W2, W3 and W4, respectively. When relay RV is operated the output of counting stages 1, 2, 3 and 4 and of windings W1, W2, W3 and W4 are connected in reversed sequence by interconnecting them through contacts h, f, d and b of relay RV.

The release of relay RV also establishes a circuit from battery through resistor 208, contact m of relay RV, filament of forward-indicating lamp FOR and contact e of relay CO to ground, lighting lamp FOR. It is pointed out that whenever relay CO is operated, battery is disconnected from the windings of the rate motor by the opening of contact f of relay CO. However, with relay CO released battery is supplied through contact f of relay CO to the windings of the rate motor and the rate motor is operated in a forward direction as a result of the simultaneously released condition of relay RV.

Whenever the circuit of Fig. 2 is in such condition that all relays are released and the two limit microswitch contacts 190 and 191 controlled by cams 192 and 193 are also released, the direction of travel of the rate motor is determined by a momentary operation of the non-locking miles-to-go key 201 either to the reverse position by the closing of contact c of key 201 or to the forward position by the opening of contacts a and b of key 201. Whenever contact c of key 201 is closed while micro-switch contact 193 is also closed, a circuit may be traced from ground through contact 198, contact c of key 201 and the winding of relay RV to battery operating relay RV. When relay RV operates, it locks over a path heretofore traced which was shown to extend through contact a of key 201 to ground. When relay RV is locked in the operated condition, it causes the rate motor to rotate in its reverse direction and, by opening its contact m, it extinguishes the forward-travel indicating lamp FOR and, by closing its contact k, it lights the reverse-travel indicating lamp REV. The circuit for the lighting of lamp REV may be traced from battery through resistor 208, contact k of relay RV, filament of lamp REV and contact e of relay CO to ground. If now contacts a and b of key 201 are opened, relay RV will be unlocked and the direction of rotation of the rate motor will be changed to the forward direction.

The slewing key 202 controls the operation of the high-speed slewing motor 212. It is the function of this motor to drive the indicator to any desired position on the scale, by operation in either direction, at a relatively high speed. This key may be operated either independently of the miles-to-go key 201, or it may be operated simultaneously with it if so desired. Operation of the non-locking slew key 202 to one position actuates the slewing motor 212 to drive the indicator in a forward direction and operation of slewing key 202 to its alternate position reverses the direction of rotation of slewing motor 212 to drive the indicator in the reverse direction. The operation of slewing key 202 to the forward position closes its contact a and opens its contact b, which latter is normally closed. When slewing key 202 is actuated to close its contact a, a circuit may be traced from ground through contact a of key 202, contact b of relay O and the winding of relay FS to battery operating relay FS. When contact b of key 202 is opened, the ground for a common cathode resistor for a group of triodes in the rate motor speed control circuit is disconnected. The closed circuit may be traced from ground through contact b of relay CO, contact b of key 202, contact d of key 202 and conductor 225 which extends into the rate motor speed control circuit where it connects through a common resistor which supplies ground to the cathode circuits of the four amplifiers which individually supply the pulses to the four motor windings. Thus when contact b of the slewing key 202 is open, the rate motor cannot rotate in either direction.

When relay FS is operated, the slewing motor is energized to rotate in a forward direction. An example of a motor which has been found suitable to perform the function of a slewing motor is identified as the CDA211052 A.C. motor with D153203 256/1 gear reduction box, both manufactured by the Diehl Manufacturing Company. The energizing circuit of the motor extends from a source of alternating current, which may be a 115-volt 60-cycle source, for instance, through conductor 230, contact f of relay FS, conductor 231, motor terminal 2, lower winding of the motor, motor terminal 4, contact a of relay FS and conductor 225 to the opposite side of the alternating-current source. Simultaneously a parallel circuit is established which may be traced from the alternating-current source through conductor 230, contact f of relay FS, contact d of relay FS, contact b of slewing-motor reversing relay RVS, which is presently released, terminal 1 of the upper winding of slewing motor 212, through the upper motor winding and its terminal 3, capacitor 239, contact e of relay RVS, contact c of relay FS, contact a of relay FS and conductor 225 to the opposite side of the alternating-current source. When slewing key 202 is operated to its reverse position contact d is opened and contact c is closed. The opening of contact d disconnects ground from the cathode resistor circuit described in the foregoing. The closing of contact c reverses the direction of rotation of the slewing motor 212 by operating relay RVS which changes the polarity of the alternating-current source applied to the motor windings. The circuit may be traced from one side of the alternating-current source through conductor 230, contact *f* of relay RVS, terminal 2 of the bottom winding of slewing motor 212 through the winding terminal 4 of slewing motor 212, contact *a* of relay RVS and conductor 225 to the opposite side of the alternating-current source. A parallel circuit is established from the alternating-current source through conductor 230, contact *f* of relay RVS, contact *e* of relay FS, contact *d* of relay RVS, capacitor 239, terminal 3 of slewing motor 212, upper winding and terminal 1 of slewing motor 212, contact *c* of relay RVS, contact *b* of relay FS, contact *a* of relay RVS and conductor 225 to the opposite side of the alternating-current source. In response to this the A.C. slewing motor 212 is rotated in the reverse direction.

It is to be understood, as explained in the foregoing, that slewing motor 212 is connected to the indicator mechanism 105 through the gearing and shafts as described. The slewing motor operates at a relatively high speed, driving the indicating mechanism at a corresponding rate. Attention is called to the fact that in operating the slewing motor 212 in either direction slewing key 202 is operated to either of its two positions and maintained by the operator in the operated position while the slewing motor functions to drive the indicator pointer 170 to the desired position for the start of operation. Thereupon the slewing key 202 is released. The miles-to-go key 201 is not required to be maintained by the operator in the position to which it is actuated as momentary operation of the key causes the circuit to lock in the desired operated position. It is desirable that the indicator pointer 170 be prevented from going beyond the limits of the scale and the present arrangement includes facilities for performing this at each end of the scale which will now be described. The circuit is arranged to automatically open the circuit of the slewing motor when the pointer 170 reaches the limit of the scale at each end thereof.

In tracing the circuit whereby relay FS, which drives slewing motor 212 in the forward direction, was operated, the path was shown to extend through contact *b* of the 0 limit relay O. The 0 limit relay O is under control of the 0-miles microswitch. As indicator 105 is driven in the direction towards 0, cam 193 which is secured to shaft 166 is rotated. The cam is arranged so that when pointer 170 reaches the 0 position cam 193 actuates bar 222, which is secured to cam 193, raising armature 199 to engage contact 190. This establishes a circuit from ground through contact 190 and the winding of relay O to battery operating relay O and opening its contact *b* which in turn releases the forward-drive control relay FS of slewing motor 212 stopping the motor.

In order to stop the slewing motor, when it is operating in the reverse direction to drive pointer 170 toward the 200-mile mark at the opposite end of the scale, it is necessary to release relay RVS which controls operation of slewing motor 212 in the reverse direction. This is performed by a microswitch under control of cam 192 which is also mounted on shaft 166. Cam 192 is arranged to raise vertical bar 221 and actuate armature 203 to open contact 198 when pointer 170 reaches the 200-mile position. In tracing the circuit by means of which relay RVS was operated, it was shown that ground was supplied from contact 198. When contact 198 is open relay RVS releases stopping slewing motor 212 with the pointer 170 at the 200-mile mark. When armature 203 engages contact 191 a circuit may be traced from ground through contact 191 and the winding of relay 200 to battery. A parallel branch extends from the right-hand terminal of the winding of relay 200 through its contact *a*, contact *c* of relay CO and the winding of relay CO to battery. Relay 200 is relatively slow to operate so that its contact *a* remains closed until relay CO, which is relatively fast in operation, operates. When relay CO operates it locks over a path from battery through the winding of relay CO, contact *d* of relay CO, resistor 205 and contact *b* of miles-to-go key 201 to ground. The operation of relay CO by opening its contact *f* removes battery from the windings of the rate motor and prevents operation of the rate motor, in the event that miles-to-go key 201 is operated to close contact *c* to drive the indicator beyond the 200-mile mark by means of the rate motor, which might damage the mechanism. It will be observed that the locking path of relay CO is independent of relay 200 and relay CO may be released by momentarily operating miles-to-go key 201 to the forward position and thus opening its contact *b*. While relay CO is operated, the path over which the slewing-motor control relay RVS is operated is opened at contact *a* of relay CO so the slewing motor 212 cannot be operated in the reverse direction as long as relay CO remains operated. The operation of relay CO by opening its contact *e* removes ground from both the forward lamp FOR and the reverse lamp REV and both lamps remain extinguished while this condition prevails.

Operation of miles-to-go key 201 to the forward position, by opening contact *b*, will now cause the release of relay CO. This will cause the rate motor to operate in the forward direction driving the indicator pointer 170 toward the 0 end of the scale as described earlier. If the rate motor is permitted to continue operation of the indicator to the 0-miles position, the miles-to-go indicator cam-drive mechanism will actuate the 0-miles microswitch which in turn operates the O relay as described. This stops the forward motion of the indicator.

The operation of the O relay to cut off forward motion of the slewing motor was described in the foregoing. Attention is now called to the fact that the O relay also functions to reverse the direction of the indicator when the indicator is being driven by the rate motor. When the O relay operates, a circuit is established from ground through contact *a* of relay O and the winding of the rate motor reversing relay RV to battery operating relay RV which locks through its contact *j* and contact *a* of miles-to-go key 201 to ground. The operation of relay RV reverses the direction of rotation of the rate motor and drives it in the direction of the 200-mile marking on indicator 105.

If the rate motor is now permitted to advance the miles-to-go indicator to the 200-mile marking on the scale, the 200-mile microswitch operates as a limiting switch and when contact 191 closes, ground is supplied through contact 191, contact *a* of relay 200, contact *c* of relay CO and the winding of relay CO to battery operating CO. When relay CO is operated, it locks up under control of contact *b* of key 201. The operation of relay CO by opening its contact *f* disconnects battery from the windings of the rate motor and by opening its contact *e* disconnects ground from lamp REV extinguishing the reverse-travel direction lamp.

The circuit now remains in the dormant condition until set into motion by the operation of the miles-to-go key to the forward position.

What is claimed is:

1. A control circuit for an indicator mechanism, said circuit having an indicator, a low-speed motor drive and a high-speed motor drive for said indicator, both connectable to said indicator, for driving said indicator at either low or high speed, a forward-driving control and a reverse-driving control for each of said motors, both selectively connectable to said motors, a limiting switch for preventing movement of said indicator beyond a limiting position, means responsive to the attainment of said limiting position by said indicator, when driven by either of said motors, for operating said limiting switch, and means responsive to the operation of said limiting switch for operating one of said motors in the reverse direction so as to drive said indicator in the reverse direction.

2. A control circuit for an indicator, said circuit comprising an indicator, a low-speed driving motor and a high-speed driving motor connected to said indicator for driving said indicator, a forward-drive control and a reverse-drive control for each of said motors, means, comprising cam controlled contacts, responsive to said reverse-drive control for said high-speed motor, for stopping said high-speed motor at a limiting reverse position of said indicator, and relay means, responsive to said stopping for disabling said reverse-drive control for said low-speed driving motor, to prevent further reverse motion of said indicator and prevent damage to said indicator.

3. An indicator-control circuit having an indicator, a motor for driving said indicator, a plurality of windings on said motor, an oscillator, an individual channel interconnecting said oscillator and each of said motor windings, means for impressing a succession of pulses through said channels on said windings in a first order to rotate said motor, means for varying the rate at which said pulses are applied on said windings in a plurality of discrete increments to change the speed of rotation of said motor in a corresponding plurality of discrete increments, and means for reversing said order to reverse the direction of rotation of said motor.

4. An indicator system comprising an oscillator, a control for said oscillator having means therein for changing the rates of oscillation of said oscillator in a plurality of discrete steps, a circuit connected to the output of said oscillator having a plurality of individual channels, means responsive to the oscillations of said oscillator for directing successive pulses through said channels, a variable-speed motor having a number of windings corresponding to said plurality of channels, each of said channels connected individually to one of said windings in a first order at a first time, to rotate said motor in a first direction, at said first time, an indicator, connected to said motor, responsive to said motor, driven in a first direction at said first time, means for interconnecting each of said channels individually to said windings in a second order at a second time, to rotate said motor and drive said indicator in a direction opposite to said motor and drive said indicator in a direction opposite to said first direction at said second time.

5. A system in accordance with claim 4 including a relatively high-speed slewing motor connected to said indicator, interconnecting circuit controls for said motors and indicator for actuating said indicator through either of said motors and means responsive to said operation for disabling the other of said motors.

References Cited in the file of this patent

UNITED STATES PATENTS

| | | |
|---|---|---|
| 2,640,957 | Macgeorge et al. | June 2, 1953 |
| 2,778,982 | Loeffler | Jan. 22, 1957 |